July 16, 1935.　　　M. A. CHESTER　　　2,008,094
SHOCK STRUT
Filed Dec. 30, 1933　　　2 Sheets-Sheet 2
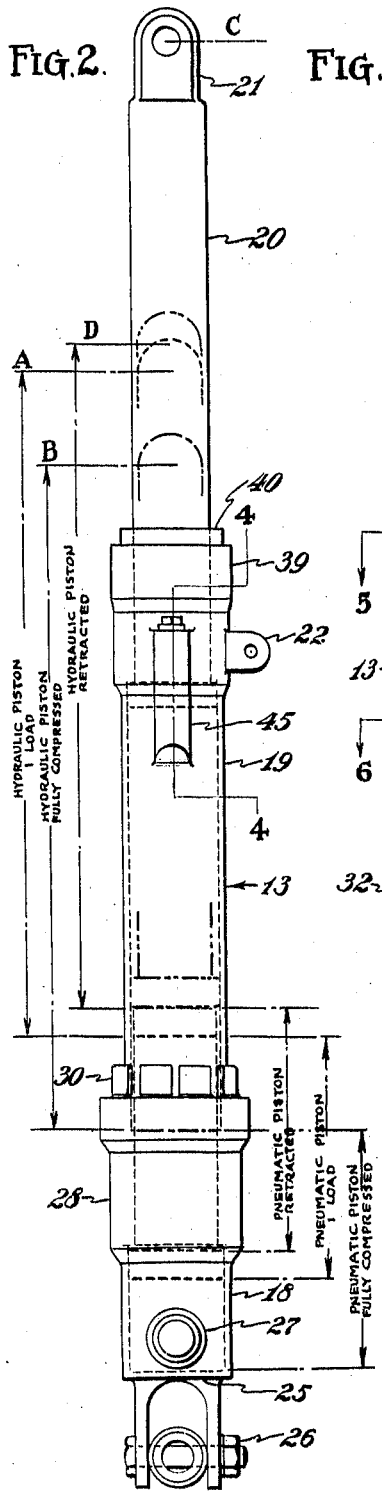
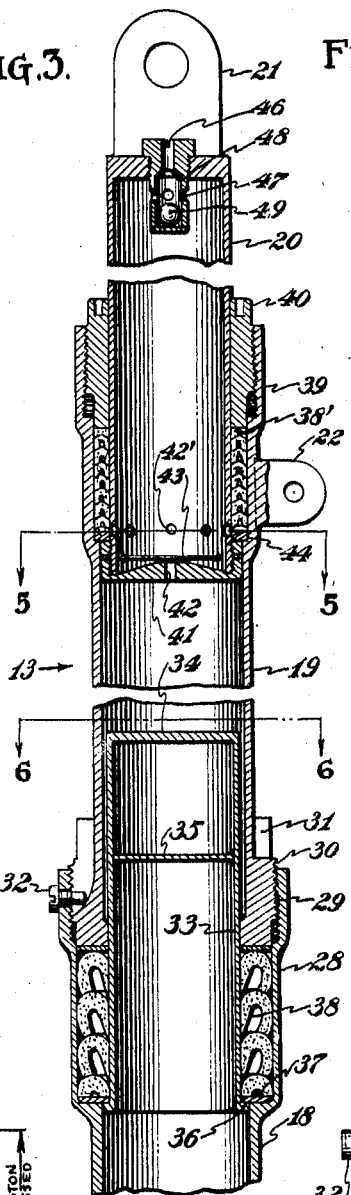
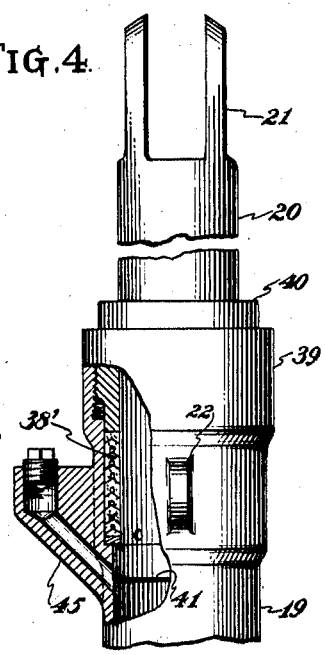
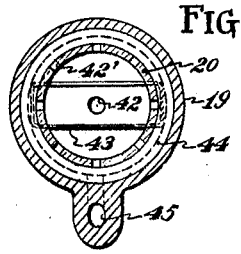
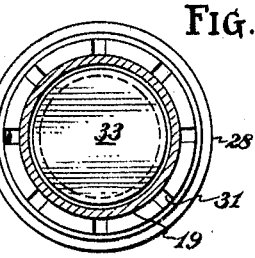
INVENTOR.
MILTON A. CHESTER.
BY
ATTORNEYS.

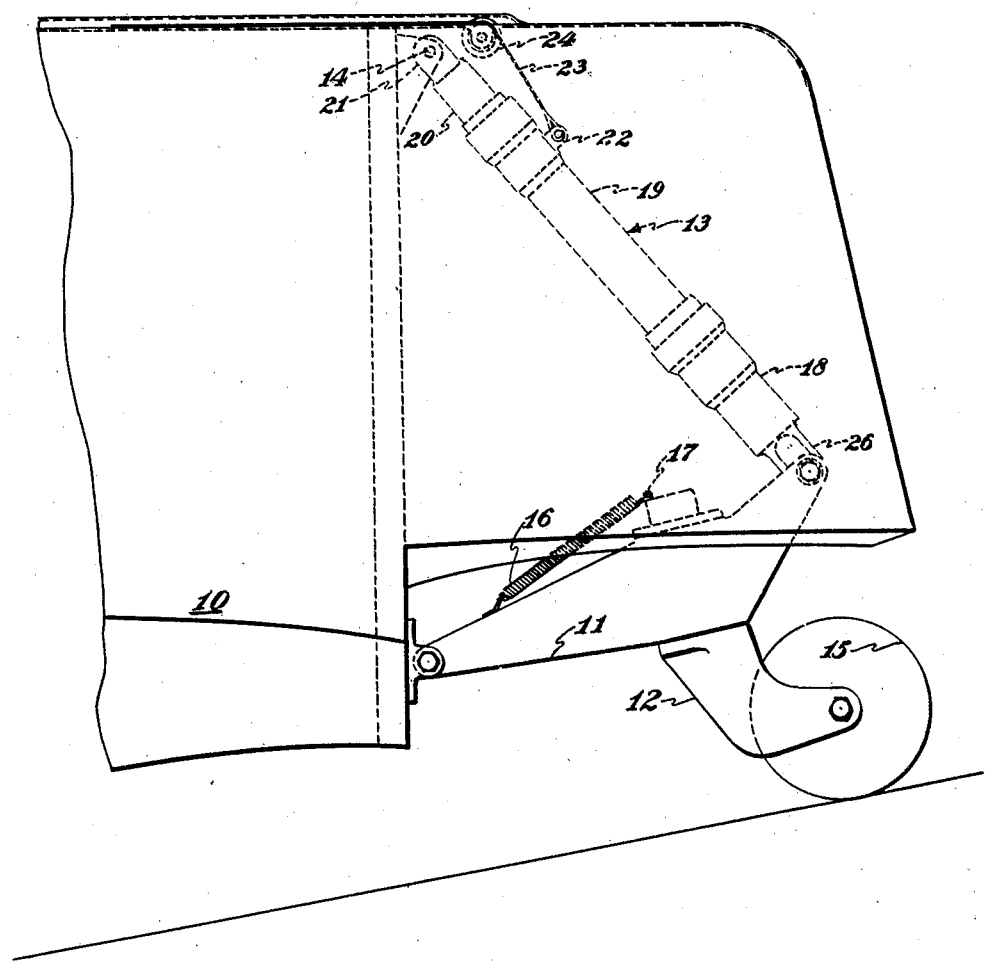

Patented July 16, 1935

2,008,094

UNITED STATES PATENT OFFICE 2,008,094

SHOCK STRUT

Milton A. Chester, North Tonawanda, N. Y., assignor to Curtiss Aeroplane & Motor Company, Inc., a corporation of New York Application December 30, 1933, Serial No. 704,640

12 Claims. (Cl. 267—64)

This invention relates to shock absorbing mechanisms, and is concerned particularly with improvements in retractable shock absorbing struts for aircraft.

An object of the invention is to provide a hydro-pneumatic shock absorbing strut, which may be, with relatively little effort, partially retracted in length while the aircraft of which it is a part is in flight.

A further object of the invention is to provide in a hydro-pneumatic shock absorber, two stages of operation, the first stage being a combination of hydraulic and pneumatic action to absorb shocks, while the second stage of operation depends wholly upon pneumatic action for absorption of shocks.

A further object is to provide a retractable hydro-pneumatic shock strut in which the pneumatic mechanism is constantly kept under high pressure, while retraction of the strut is effected by collapsing the hydraulic mechanism.

Still another object is to provide, in a hydro-pneumatic shock strut, a floating piston for separating the compressed gas and hydraulic fluid of the strut.

A further object is to provide a hydro-pneumatic shock absorbing strut including a floating piston for separating the compressed gas and hydraulic fluid, and so constructed that the compressed gas assumes the taxiing loads imposed thereon by the weight of the aircraft, while the hydraulic mechanism assumes the majority of the shock stresses imposed on the strut upon landing of the aircraft.

Still another object is to provide a shock strut adapted for use in connection with the tail wheel of an aircraft of either the land or water type, the strut being adapted for retraction of the tail wheel within the aircraft fuselage or boat body.

Still another object is to provide a hydro-pneumatic shock strut of light weight construction and simplicity of operation and maintenance, which lends itself readily to aircraft use.

Further objects will be apparent in the following specifications and claims.

Generally, the strut comprises a cylinder having a hollow plunger reciprocable therein, the outer ends of the cylinder and plunger having fittings for connection to an aircraft. The plunger, at its outer end, is vented to the atmosphere, and at its inner end, an orificed closure is provided. Within the cylinder is a floating piston, means being provided for limiting the reciprocative movement thereof. Between the piston and the closed cylinder end, compressed air or gas is admitted to form a resilient gas cushion. The cylinder on the other side of the piston is filled with fluid which may pass into the plunger through the orificed closure, thereby providing a non-restitutional dash-pot effect for absorbing shocks. The hydraulic and pneumatic phases of shock absorption act together until the fluid has all passed within the plunger, whereupon the plunger abuts the piston and subsequent shocks or forces applied on the strut act on the compressed gas alone.

It is well known in the art to provide hydropneumatic shock absorbers, but it is believed to be novel to provide relatively independent phases of operation for the hydraulic and pneumatic mechanism. Floating pistons to separate the gas and fluid are known but these are not subject to contact by a plunger or the like. The compressed gas in such struts always acts on the hydraulic fluid, whereas, in this invention, the stops provided for the floating piston permit the hydraulic mechanism to act alone under only atmospheric pressure. Also, in this invention, the amount of both compressed gas and hydraulic fluid is fixed, making the strut unitary and self-contained. Retraction of the strut of this invention may be effected by collapsing the hydraulic mechanism against atmospheric pressure only, leaving the compressed gas, in this operation, entirely intact.

In the drawings, in which similar numbers indicate similar parts:

Fig. 1 is a side elevation of the rear end of an aircraft boat body showing the strut of this invention in the "one load" position;

Fig. 2 is an elevation of the strut, showing in dotted lines, the several positions which it may assume in operation;

Fig. 3 is an axial section through the shock strut showing details of construction thereof;

Fig. 4 is a section on the line 4—4 of Fig. 2;

Fig. 5 is a section on the line 5—5 of Fig. 3; and

Fig. 6 is a section on the line 6—6 of Fig. 3.

Referring to Fig. 1, an airplane boat body 10, which may also be considered as the rearward end of an airplane fuselage, pivotally carries a yoke 11 in which is swiveled a tail wheel fork 12, and from the rear end of the yoke, a shock strut 13 extends upwardly to a suitable pivot 14 on the aircraft structure. The tail wheel fork 12 carries a wheel 15 for ground contact, and a spring 16, or equivalent means, tends to hold the fork and wheel in the line of flight. The spring is attached as at 17, eccentrically on the tail wheel fork spindle, so that it exerts a continuous pull in a forward direction, though allowing the fork to swivel if the side forces imposed thereon are greater than the tension in the spring.

The strut 13 comprises a lower cylinder 18 within which is fixedly screwed an intermediate cylinder 19. Into the cylinder 19, a plunger 20 is adapted to telescope, said plunger being provided at its upper end with an eye 21 for connection to the pivot 14. A bracket 22 toward the upper end of the cylinder 19 provides a connection for a cable 23, shown in Fig. 1, which may pass over a sheave 24 and forwardly to the pilot's cockpit (not shown). The construction of the strut, as will hereafter be more particularly described, is such that the cable 23 may be drawn in to collapse hydraulic mechanism of the strut 13, thereby pulling the yoke 11 with the fork 12 and wheel 15 upwardly out of the aircraft slipstream. When preparing for landing, tension in the cable 23 may be relaxed, allowing the strut 13 to extend by gravity to a landing position below the aircraft body 10.

Referring now to Figs. 2 to 6, inclusive, the lower cylinder 18 is closed as at 25 at its lower end, said end being provided with a suitable connection 26 for pivoting to the yoke 11. The lower cylinder 18 is also provided with a valve 27 of conventional form, whereby air or gas under pressure may be forced into the cylinder. At its upper end, the cylinder 18 is provided with an enlarged portion 28 carrying screw threads 29 within which the lower threaded end 30 of the intermediate cylinder 19 may be screwed. The lower end of the cylinder 19 is also provided with a plurality of radial slots 31 within one of which a locking screw 32 may be engaged to prevent turning of the cylinders 18 and 19 with respect to each other. Within the cylinders 18 and 19, a floating piston 33 is adapted to slide, this piston being of hollow cylindrical form, and having an upper head 34 and an intermediate partition 35. The lower end of the piston side wall is radially offset, as at 36, to form a shoulder which, when the piston is in its uppermost position, abuts against an annular ring 37 in the enlarged portion 28 of the lower cylinder, thus forming a stop to limit upward travel of the piston. In the space between said ring and the bottom of the cylinder 19, packing rings 38 are inserted, these rings bearing upon the outer surface of the piston 33 to effect a tight seal against the escape of compressed gas from the lower cylinder 18. The piston 33 may, by the above described construction, slide within the cylinders between limiting positions established by the ring 37, and by contact of the bottom of the piston with the bottom 25 of the cylinder 18. The partition 35 in the piston 33 is so spaced as to provide a predetermined clearance volume, and may be organized to establish a definite compression ratio of the confined gas, between the extreme positions of adjustment of the piston.

The upper end of the cylinder 19 is provided with an enlarged portion 39, internally threaded to receive a packing nut 40. This packing nut bears upon packing rings 38' within the cylinder, which in turn bear upon the outer surface of the plunger 20. The plunger 20, at its lower end, has threaded thereon a cap 41 provided with a central opening 42. Safety wire 43 serves to lock the cap to the plunger to prevent relative turning, and thus to hold the cap firmly in place. The upper edges of the cap 41, when the plunger is in its uppermost position, bear on an annular ring 44 which, in turn, bears against the packing rings 38'. Openings 42' are provided in the wall of the plunger 20 to allow fluid, contained within the cylinder 19, to pass through the opening 42 and through the openings 42' to fill the space formed between the plunger and the cylinder 19, as the plunger is telescoped therewithin. The plunger 20 is hollow and is of such length that the cubic capacity thereof is substantially greater than the cubic capacity of the cylinder 19 when the plunger is in its uppermost position. The cylinder 19 is provided with a filler spout 45, so placed that when fluid is poured into it, the strut may be filled with fluid to a level slightly above the openings 42'. The upper end of the plunger 20 is provided with a vent opening 46. This, in its preferred form, comprises a hollow plug having side openings 47, a valve seat 48 and a ball valve 49. When the strut is in any substantially upright position, the vent is open and is free to maintain a balance at atmospheric pressure between the inside of the plunger and the atmosphere. Should the strut be inverted, the ball 49 seats against the seat 48 and prevents the dripping or loss of the contained fluid.

The operation of the strut in absorbing shocks is as follows—when the aircraft is in flight, preparatory to a landing, the cable 23 is relaxed by the aircraft crew, permitting the strut to extend to its full length, as is shown in solid lines in Fig. 2. The elements of the strut in Fig. 3 are shown as they would be with the strut fully extended. Upon landing, shock stresses are imposed on the lower connection 26, tending to telescope the strut. Thereupon, fluid in the cylinder 19 is placed under pressure and issues through the opening 42 into the hollow plunger 20 which is under atmospheric pressure only by virtue of the vent 46. If the initial compression of air or gas within the lower cylinder 18, and within the piston 33 is less than the pressure exerted on the fluid, the floating piston 33 will slide downwardly within the cylinder 18 until the fluid pressure and gas pressure are in balance. As the strut telescopes, the fluid passes, as mentioned, into the plunger 20, and a certain amount of the fluid passes through the openings 42' to fill the void that would otherwise be created between the plunger and the cylinder 19. When the aircraft finally comes to rest upon the ground, the weight thereof will cause the plunger 20 to fully telescope within the cylinder 19 until the cap 41 abuts against the top 34 of the floating piston 33. The weight of the aircraft will thereupon be balanced by the gas pressure in the cylinder 18, and the damping action of the fluid mechanism will no longer have any effect. As the aircraft may taxi over the ground, irregularities in the ground surface will cause the plunger 20 and the piston 33 to move together within the cylinders 18 and 19. The "one load" length of the strut is shown at A in Fig. 2, the datum line for such length being the bottom of the strut. In such position, the plunger 20 abuts the floating piston 33, while the piston 33 is slightly telescoped into the cylinder 18. Fig. 2 also shows at B the length of the strut when fully compressed—that is, when the plunger 20 abuts the floating piston 33, and when the piston 33 is forced all the way into the cylinder 18, so that the bottom of said piston contacts the bottom closure 25 of the cylinder 18. Such position would be abnormal and would not be encountered in service.

In taking off, the strut fully extends to the full line position shown at C of Fig. 2. Thereafter, by drawing in the cable 23, the pilot may collapse the hydraulic portion of the strut working against atmospheric pressure only, so that the plunger 20 abuts against the piston 33. A considerable saving in the length of the strut is thereby effected, as is apparent in Fig. 2, which shows at D the length of the strut retracted, the retracting of the strut serving to effect withdrawal of the wheel 15 upwardly to a position well out of the airstream and reducing the parasite drag of the tail wheel element.

When the construction above described is applied to the boat body of an amphibian, the strut and tail wheel elements are held in their retracted positions when the craft is effecting a water landing, whereby the considerable drag which would otherwise be caused by the wheel, is eliminated. A strut of the character described may also be used in connection with the main forward landing gear of an aircraft, as will be obvious to those familiar with the art.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

'What is claimed is:

1. A hydro-pneumatic shock absorber comprising a cylinder closed at one end, a floating piston slidable in said cylinder toward said closed end and defining therewith a space for compressed gas, a hollow plunger having an orificed head slidable within said cylinder and extending from the open end thereof, and packing means carried by said cylinder for said piston and for said plunger, said cylinder having hydraulic fluid therewithin adapted to pass through said orifice into said plunger upon compression of said shock absorber and said plunger having a vent for allowing said fluid to work at all times under atmospheric pressure.

2. In a hydro-pneumatic shock absorber, a cylinder containing compressed gas and hydraulic fluid, a floating piston slidable in said cylinder and separating said gas and fluid, and a resilient limit stop in said cylinder against which said compressed gas may cause said piston to abut.

3. In a hydro-pneumatic shock absorber, a cylinder containing compressed gas and hydraulic fluid, a floating piston slidable in said cylinder and separating said gas and fluid, and adjustable packing means carried by said cylinder intermediate its length for sealing said floating piston.

4. In combination, in a hydro-pneumatic shock absorber having a cylinder, a means for entraining in said cylinder a fixed amount of compressed gas, hydraulic fluid in said cylinder adapted to act upon and further compress said gas, a hollow plunger acting on said fluid and having means to permit the flow of fluid between said cylinder and said hollow plunger, and a vent in said plunger to keep the fluid therein at all times under atmospheric pressure.

5. In combination in a hydro-pneumatic shock absorber, a plunger slidable within a cylinder, hydraulic fluid acting therebetween for the absorption of shocks, said fluid being vented to the atmosphere, and a floating piston having limited reciprocal movement within said cylinder, said piston defining with said cylinder a closed space for containing gas under pressure, said fluid when subjected to shock pressure being adapted to act on said floating piston to further compress said gas.

6. In a hydro-pneumatic shock absorber, a pair of telescoping members containing fluid, venting means for holding said fluid under atmospheric pressure, and a floating piston in one said member defining therewith a space, separate from said fluid, for containing gas under pressure, said piston being organized for further compressing said gas upon imposition of shocks on said shock absorber.

7. In a hydro-pneumatic shock absorber having a cylinder closed at one end, a floating piston reciprocable within and toward the closed end thereof to define therewith a closed space for gas under pressure, and atmospherically vented hydraulic shock absorbing means acting upon the side of said piston opposite said gas space.

8. The combination, in a hydro-pneumatic shock absorber, of means for retaining therein a fixed amount of compressed gas for resiliently absorbing shocks, means for retaining therein a fixed amount of fluid for damping shocks, and selectively operable means for partially collapsing said shock absorber without disturbing the amount of compressed gas or fluid contained therein.

9. A compressible hydro-pneumatic shock absorber strut comprising a fluid shock absorbing mechanism, a pneumatic shock absorbing mechanism, and selectively operable means to retract said strut through the range of travel of said fluid shock absorbing mechanism.

10. A compressible hydro-pneumatic shock absorber strut comprising a fluid shock absorbing mechanism containing a fixed amount of fluid, a pneumatic shock absorbing mechanism containing a fixed amount of compressed gas, and selectively operable means to retract said strut through the range of travel of said fluid shock absorbing mechanism, the quantity of fluid within said mechanism remaining fixed throughout said retraction.

11. In a hydro-pneumatic shock absorber, a pair of telescoping members containing fluid, means for venting said fluid to atmospheric pressure, and a movable partition in one said member defining therewith a space, separate from said fluid, for containing gas under pressure, said partition being organized for further compressing said gas upon imposition of shocks on said shock absorber.

12. In a hydro-pneumatic shock absorber having a container closed at one end, a movable partition within said container toward said closed end to define therewith a closed space for gas under pressure, and atmospherically vented hydraulic shock absorbing means acting upon the side of said partition opposite from said gas space.

MILTON A. CHESTER.